N. I. SHULL.
Cultivator.
Patented Nov. 26, 1836.
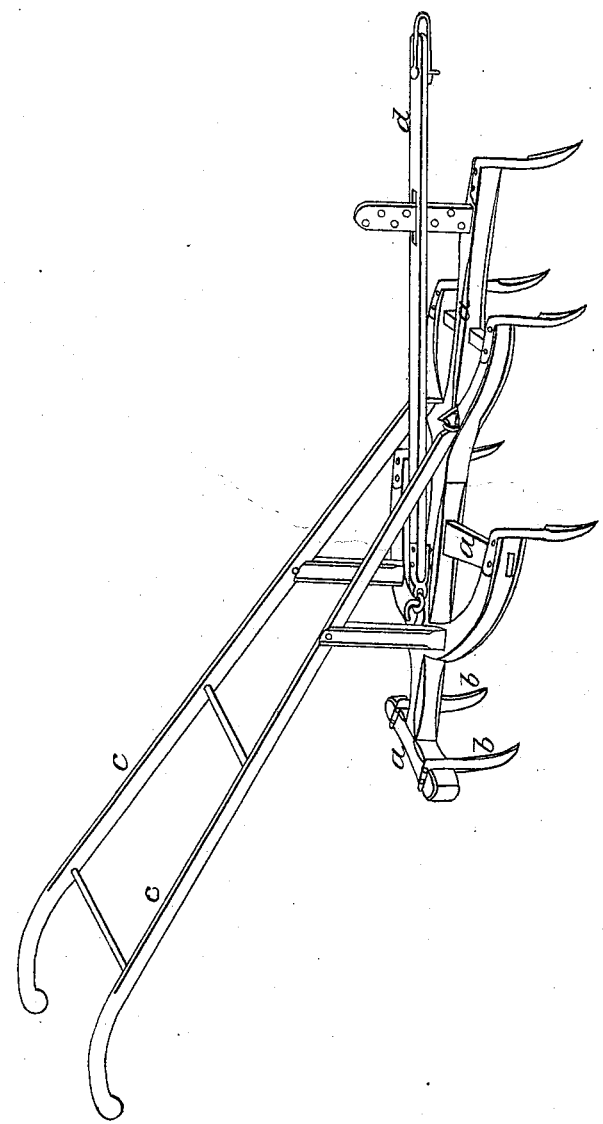

UNITED STATES PATENT OFFICE.

NOAH J. SHULL, OF BENSALEM TOWNSHIP, BUCKS COUNTY, PENNSYLVANIA.

CULTIVATOR OR HOE-HARROW.

Specification of Letters Patent No. 88, dated November 26, 1836.

*To all whom it may concern:*

Be it known that I, NOAH J. SHULL, of Bensalem township, in the county of Bucks, in the State of Pennsylvania, farmer, have invented or discovered a new and useful Improvement in Cultivators or Hoe-Harrows to Prevent them from Clogging or Choking; and I do hereby declare that the following is a full and exact description of the same as invented or improved by me.

The cultivator or hoe-harrow as improved by me is so constructed, by attaching the hoes or teeth to the front ends or sides of the beams, or other parts of the cultivator or harrow (to which they are secured) that any straw, stones, or other substance which would otherwise choke, or clog up in front of the hoes or teeth will pass up over the upper ends thereof, and fall off from the cultivator or harrow. To effect this object the shanks or teeth are made so as to extend up across the front part of the frame to which they are attached, and the upper ends of said shanks are bent back over on to the top of the wood work or frame, to which they are secured by small bolts passed through the ends of the shanks of the hoes or teeth, and through the frame of the cultivator or harrow.

The front ends, or sides of the frame where the hoes or teeth are attached is so shaped, and the hoes or teeth so attached, that the front of the upright part or shank will incline back, so that straw, stones, or other substance will more readily pass over on to the top, to prevent the choking of the harrow.

The frame of the cultivator or hoe-harrow may be made in any convenient shape or form, provided it is so constructed that the hoes or teeth may be attached as above mentioned to the front end or sides of the different parts of the frame, that is, so that the frame or woodwork shall not extend in front, over the hoes, or teeth to render it liable to choke. It may be made as follows—let there be a sill or beam extending longitudinally through the center of the frame from the front end to the back, with a hoe or tooth attached to the front end in the manner above described. Passing through, or attached, and secured to said sill or beam, there will be cross pieces extending out a suitable distance each way therefrom. The cross pieces may be straight, with a hoe or tooth attached to the front side of the ends thereof in the manner aforesaid or the ends of said cross pieces may be bent or curved toward the front of the cultivator or harrow so that the hoes or teeth may be attached to the ends thereof, the same as the hoe or tooth on the front end of the main sill or beam. Such slats or braces as may be necessary to give the work sufficient strength will be placed in such places as the particular form, and construction of the other parts of the frame may render necessary. The hoes, or teeth may all be of the same size or dimensions; or for tilling corn, and for other similar purposes a part of them may be made large to act as small plows, and the other of the usual size. The stilts or handles, and the lever, and other appendages for regulating the draft may be fixed in the usual or in any other convenient manner.

The part claimed as an invention, discovery, or improvement is not the particular form or construction of the frame as that may be made in any manner which will admit of the above mode of attaching the hoes or teeth—but it is the above described form and made of constructing and attaching the hoes or teeth (whether large or of the common size, to act as plows or as cultivators) to the front ends or sides of the different parts of the frame, so that the frame or woodwork shall not extend in front, over said hoes or teeth.

The object intended to be attained by the plan above described is to prevent the liability to clog or choke, by straw, sticks, stones, or other substances gathering or catching on the front of the hoes or teeth under the frame or woodwork of the cultivator or hoe-harrow.

NOAH J. SHULL.

Witnesses:
DAVID B. LEE,
M. G. BRYANT.